(12) United States Patent
Schmitz

(10) Patent No.: US 11,465,708 B2
(45) Date of Patent: Oct. 11, 2022

(54) TORQUE DETECTION DEVICE AND TRANSMISSION UNIT FOR A MUSCLE-POWERED VEHICLE

(71) Applicant: Pinion GmbH, Denkendorf (DE)

(72) Inventor: Michael Schmitz, Mössingen (DE)

(73) Assignee: Pinion GmbH, Denkendorg (DE)

( * ) Notice: Subject to any disclaimer, the term of this patent is extended or adjusted under 35 U.S.C. 154(b) by 15 days.

(21) Appl. No.: 16/942,551

(22) Filed: Jul. 29, 2020

(65) Prior Publication Data

US 2020/0354006 A1 Nov. 12, 2020

Related U.S. Application Data

(63) Continuation of application No. PCT/EP2019/051666, filed on Jan. 23, 2019.

(30) Foreign Application Priority Data

Jan. 29, 2018 (DE) ..................... 10 2018 101 911.4

(51) Int. Cl.
*B62M 3/00* (2006.01)
*B62J 45/411* (2020.01)
*G01L 3/10* (2006.01)

(52) U.S. Cl.
CPC ............ *B62M 3/003* (2013.01); *B62J 45/411* (2020.02); *G01L 3/105* (2013.01)

(58) Field of Classification Search
CPC .......... F16F 1/145; G01L 5/221; G01L 3/105; B62D 6/10; B62M 11/06; B62M 3/003; B62J 45/411
USPC ...................... 73/862.331–862.338
See application file for complete search history.

(56) References Cited

U.S. PATENT DOCUMENTS

| | | | |
|---|---|---|---|
| 4,907,461 A * | 3/1990 | Eto | B62D 6/10 73/862.322 |
| 5,924,519 A * | 7/1999 | Shimizu | B62D 5/043 180/444 |
| 9,302,738 B2 * | 4/2016 | Lermen | B62M 11/145 |

FOREIGN PATENT DOCUMENTS

| | | | |
|---|---|---|---|
| CN | 1118434 A | | 3/1996 |
| CN | 1088513 | * | 7/2002 |
| CN | 106218801 A | | 12/2016 |
| DE | 19609981 A1 | | 9/1997 |
| DE | 19613079 A1 | | 11/1997 |
| DE | 69512958 T2 | | 2/2000 |

(Continued)

OTHER PUBLICATIONS

International Search Report corresponding to International Application No. PCT/EP2019/051666, dated Apr. 30, 2019, 13 pages.

*Primary Examiner* — Octavia Davis Hollington
(74) *Attorney, Agent, or Firm* — Reising Ethington P.C.

(57) ABSTRACT

A torque detection arrangement for a vehicle driven by muscle power has an input shaft via which a torque for driving the vehicle can be transmitted. The torque is to be detected. At least one rotary member is mounted on the input shaft and is designed to transmit the torque. The input shaft and the rotary member are resiliently connected in the rotational direction via a torsion spring arrangement. A twisting angle detection arrangement is designed to detect a rotation of the rotary member relative to the input shaft. The input shaft is designed as a hollow shaft. A torsion spring of the torsion spring arrangement is arranged inside the hollow input shaft.

14 Claims, 3 Drawing Sheets

(56) References Cited

FOREIGN PATENT DOCUMENTS

DE 102011120675 A1 6/2013
JP 2016060384 A * 4/2016

* cited by examiner

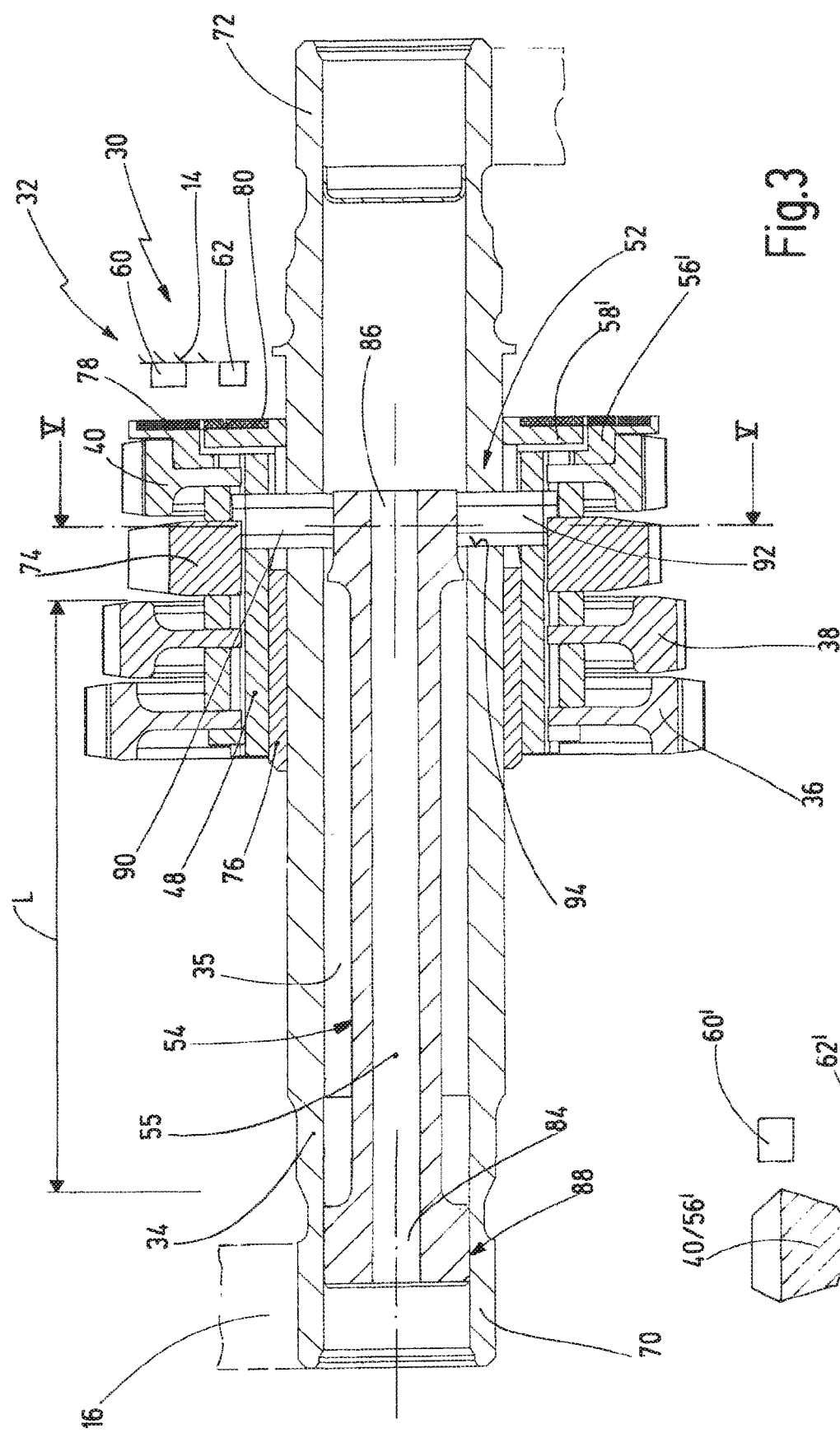
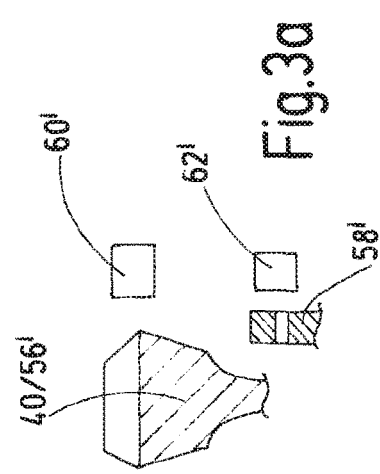
Fig.3
Fig.3a

TORQUE DETECTION DEVICE AND TRANSMISSION UNIT FOR A MUSCLE-POWERED VEHICLE

CROSS-REFERENCE TO RELATED APPLICATIONS

This application is a continuation of International patent application PCT/EP2019/051666, filed Jan. 23, 2019, which claims the priority of German patent application DE 10 2018 101 911.4, filed Jan. 29, 2018, the entire contents of these earlier applications being incorporated herein by reference.

BACKGROUND

The present invention relates to a torque detection arrangement for a vehicle driven by muscle power, with an input shaft via which a torque to be detected can be transmitted for driving the vehicle, with at least one rotary member, in particular in the form of a drive wheel, which is mounted on the input shaft and which is designed to transmit the torque, for example to a driven wheel, with a torsion spring arrangement, the input shaft and the rotary member being resiliently connected in the direction of rotation via the torsion spring arrangement, and with a twisting angle detection arrangement which is designed to detect twisting of the rotary member relative to the input shaft.

Further, the present invention relates to a transmission unit for a muscle-powered vehicle, wherein the transmission unit includes a torque detection arrangement of the type described above.

The above-mentioned torque detection arrangement and the associated transmission unit are known from the document DE 10 2011 120 675 A1.

Torque detection arrangements of the type described above are designed to detect torque provided by muscle power to drive a vehicle.

It is generally known that bicycles are equipped with auxiliary motors, which can, for example, be arranged as hub motors in the area of the front or rear wheel hub. However, auxiliary motors can also be arranged as a middle motor in the area of a bottom bracket bearing of a bicycle. The auxiliary motor can drive the bicycle as the sole drive, but preferably it provides a drive torque that supports a drive by muscle power.

If the driving torque provided by muscle power is to be supported by the auxiliary motor in order to facilitate driving the bicycle, it is useful to detect the torque introduced by muscle power.

Document WO 99/030960 A1 discloses a torque sensor which is integrated together with an electric motor in a bottom bracket of the vehicle and which has two band-shaped magnetic poles which are displaced against each other by torsion. The disadvantage here is that the construction and the detection of the torsion by means of induction coils is technically complex and that the sensor requires a large installation space within the bottom bracket.

Furthermore, it is known to realize a torque sensor by means of a mechanical spring, wherein two elements resiliently connected to each other by means of a torsion spring are twisted against each other and wherein the introduced torque can be detected via the twisting angle to be detected. In many cases it is disadvantageous that a very low spring constant of the torsion spring is necessary for the precise measurement of the torque. Torsion springs with a low spring constant allow a large torsional travel of the elements to be twisted against each other, which makes driving the vehicle with muscle power uncomfortable. Furthermore, the torsion spring can be overloaded at high torques.

From document DE 10 2011 120 675 A1 mentioned at the outset, it is known to provide a torque sensor that can precisely measure a torque introduced by muscle power with little technical effort. This is achieved by rotating the drive wheel on the input shaft by a predefined idle travel, wherein a stop is formed between the drive wheel and the input shaft in the direction of rotation, which limits the idle travel and a spring travel of the spring element.

As the spring travel of the spring element is limited by the stop, a torsion spring element with any spring constant can be used, which, if the spring constants are selected appropriately, increases the precision of the torque detection arrangement. The torque to be detected can be determined with a corresponding sensitivity. Since the idle travel is limited by the stop, the torque detection arrangement has a usual response behaviour, since with a correspondingly high torque, the torque is transmitted directly after a slight rotation of the input shaft relative to the drive wheel. Furthermore, this prevents the torsion spring element from being overloaded. Since essentially mechanical elements are used to establish the torsion angle, the torque detection arrangement can be implemented with technically simple means. As a result, a torque detection arrangement and a corresponding transmission unit can be provided which can precisely detect a torque with simple means and which at the same time has a comfortable and usual response behaviour.

Document DE 699 00 619 T2 discloses a torque detection arrangement with two magnetic rings which can be used to detect relative rotation between an input shaft and a drive wheel. A torsion spring arrangement is provided between the input shaft and the drive wheel.

Document U.S. Pat. No. 6,851,497 B1 also reveals a torque detection device, wherein an axial offset of a free-wheel equipped with a gear rim is detected.

Another torque measuring device for a bicycle is known from document WO 2011/074947 A1.

Various types of torsion spring arrangements are known from the document DE 10 2011 120 675 A1. In one design, the torsion spring element has a radial outer ring and a radial inner ring, which are connected to each other by radially extending leaf spring elements. In an alternative design, such an outer ring and inner ring are equipped with contact sections between which a spiral spring element is arranged in each case.

SUMMARY

Against the above background, it is an object of the invention to provide an improved torque detection arrangement for a muscle-powered vehicle and a correspondingly improved transmission unit.

The above object is achieved in the torque detection arrangement mentioned above by the fact that the input shaft is designed as a hollow shaft, wherein a torsion spring of the torsion spring arrangement is arranged within the input shaft.

According to a second aspect of the present invention, the above object is achieved in the aforementioned torque detection arrangement by the fact that the torsion spring arrangement has a torsion bar spring.

The first and second aspects of the present invention can be advantageously combined.

Further, the above task is solved by a transmission unit for a muscle-powered vehicle, said transmission unit including a torque detection arrangement according to the first and/or second aspect of the present invention.

Compared to known torque detection arrangements, a compact design can be realized. By accommodating the torsion spring within the input shaft, radial and/or axial installation space around the input shaft can be saved. In addition, a torsion spring arrangement in which the torsion spring is formed by a torsion bar spring is inexpensive and easy to install.

The input shaft is preferably formed with crank fixing sections at its ends, by means of which cranks can be fixed for muscular drive of the input shaft. The input shaft is preferably designed as a continuous hollow shaft. In this case, the input shaft in the transmission unit according is a crankshaft for driving a vehicle, in particular a bicycle, by means of cranks which are fixed to the input shaft. In the rotational torque detection arrangement, the rotating member is preferably a driving wheel which is in engagement with a driven wheel, in particular meshing with a driven wheel, or is a sleeve to which at least one such driving wheel is fixed. The transmission unit is preferably a countershaft transmission with a plurality of driving wheels meshing with respective driven wheels in order to be able to establish a plurality of gear ratios. The transmission unit is preferably arranged in a bottom bracket area of a vehicle frame, so that the transmission unit is particularly suitable for a mid-engine arrangement.

Preferably, the torque detection arrangement has a twist limitation as it is also described in general in the document DE 10 2011 120 675 A1, the overall disclosure of which is to be fully contained by reference in the present case.

The twist limitation is preferably set to a range between 0.5° and 15°, in particular to an idle travel or maximum twist angle of 1° to 10°.

The torsion bar spring according to the second aspect of the present invention preferably has an axial length greater than 15 mm, in particular greater than 20 mm and preferably greater than 25 mm. It is also particularly preferred if the axial length of the torsion bar spring is less than 120 mm. The torsion bar spring may extend axially continuously from one spring end to a second spring end, but may also be folded so that the torsion bar spring has a first axial section defining the first spring end and a second axial section axially overlapping therewith and at the end of which the second spring end is formed.

Twist limitation can be realized, for example, between an external gearing of the input shaft and an internal gearing of the drive wheel or of a sleeve connected to the drive wheel, as described in document DE 10 2011 120 675 A1. However, the limitation of twist can also be realized in any other way, in particular by a transverse pin passing through a radial opening of the input shaft, as described below.

The torque applied to the input shaft can be determined by measuring the torsion of the torsion spring, which is done by the twisting angle detection arrangement. Furthermore, in many cases a rotational speed detection can also be carried out automatically, for example by detecting the rotational speed from a detector wheel connected to the input shaft or to the drive wheel.

The muscle-powered vehicle is preferably a bicycle, but can also be a tricycle, a cart, a boat, a rail vehicle etc.

The object is thus completely achieved.

According to a preferred embodiment, the torsion spring has a spring axis that is aligned parallel to the input shaft, especially coaxial with the input shaft.

The torsion bar spring according to the second aspect of the invention can generally be integrated into the gear unit in a manner parallely offset to the input shaft. However, it is preferable that the torsion bar spring be mounted coaxially within the input shaft. In this case, the greatest possible space saving is achieved.

According to another preferred design, the torsion spring is non-rotatably connected to the input shaft at a first spring end and non-rotatably is connected to the drive wheel at a second spring end. The connections can be direct or indirect.

The torsion spring can extend in the axial direction from the first spring end to the second spring end, but can also be folded as indicated above.

It is also advantageous if the second spring end is non-rotatably connected to a transverse pin which extends through a radial opening in the input shaft and which is directly or indirectly non-rotatably connected to the drive wheel.

The non-rotatable connection is established by the transverse pin engaging in a radial groove of the second spring end and in a radial groove of the drive wheel or of a drive wheel sleeve. The radial opening can be located between a first axial end and a second axial end of the input shaft, especially between two crank fixing sections.

It is particularly preferred here if the radial opening is designed as a hole slotted in the circumferential direction so that the transverse pin can be rotated to a limited extent in relation to the input shaft over an idle travel.

This idle travel can also be used to limit the twisting between the input shaft and the drive wheel. Consequently, the idle travel can preferably extend over an angular range of 1° to 15°. In another variant, the limitation of rotation is achieved by other means and the slotted hole allows a larger idle travel. This can be advantageous if the slotted hole is not to be used as a stop for the idle travel.

According to another generally preferred design, the transverse pin abuts radially on the outside on an inner peripheral portion of the drive wheel or of a sleeve to which the drive wheel is non-rotatably connected.

The inner peripheral portion of the drive wheel or sleeve can, for example, be formed by a tip circle of an internal gearing.

By contacting the inner peripheral portion, the transverse pin can be fixed in radial direction in the manner of a radial stop.

In accordance with another generally preferred design, the drive wheel is non-rotatably connected to a sleeve which is mounted on the input shaft via a rotary bearing, in particular a plain bearing or a roller bearing so as to be at least limitedly rotatable and/or to which at least one second drive wheel is non-rotatably connected.

The rotary bearing can be interrupted in the axial direction so that a transverse pin also extends through the rotary bearing in the radial direction. However, the rotary bearing can also be arranged on one axial side of the transverse pin.

The rotary bearing serves to facilitate rotational the drive wheel in relation to the input shaft within the idle travel.

It goes without saying, however, that the drive wheel should preferably be regarded as a fixed wheel, which is generally connected to the input shaft in a rotationally fixed manner in the circumferential direction after completion of the idle travel, so that drive torque can be transmitted directly from the input shaft to the drive wheel.

The torsion spring is preferably a bar spring made of a material that allows elastic relative rotation of a first spring end with respect to a second spring end.

The material can be, for example, a steel, or a stainless steel, but can also be a composite material, for example a carbon fiber composite. The bar spring can be designed as a solid bar spring, but is preferably designed as a tube bar spring. As mentioned above, the torsion spring preferably has an axial length in a range between 15 mm and 120 mm. The torsion spring also allows elastic torsion between the spring ends in a range between 0.5° and 15°.

Since the idle travel is preferably in a range between 1° and 10°, plastic deformation of the torsion spring can be avoided.

The torsion spring can be connected at the first spring end, for example via a shaft-hub connection, to an inner peripheral portion of the input shaft. This makes it easy to insert the torsion bar spring axially into the input shaft. The shaft-hub-connection can be, for example, an axial toothing like a spline toothing. The second spring end of the torsion bar spring is then in the assembled position axially aligned with the radial opening of the input shaft, so that the transverse pin can be pushed radially through the input shaft and the second spring end for assembly. This also allows the torsion bar spring to be secured in the axial direction with respect to the input shaft. It is also possible to secure a sleeve, to which a number of gears are fixed, axially in relation to the input shaft.

When the drive wheel or a sleeve on which the drive wheel is fixed is mounted, a non-rotatable connection is established between the transverse pin and the drive wheel. Furthermore, this provides a loss prevention or radial fixation of the transverse pin, especially when the transverse pin rests at both radial ends against an inner peripheral portion of the drive wheel or of the drive wheel sleeve.

In general, the material of the bar spring can also be a plastic material, for example an elastically deformable rubber material. Alternatively, it is also possible to form the torsion spring by means of a coil spring.

It is also advantageous overall if the twisting angle detection arrangement has two detector wheels, one of which is non-rotatably connected to the input shaft and the other to the drive wheel.

The detector wheels have alternating features in the circumferential direction, which may be formed by holes, for example, but may also be formed by magnets or the like.

Preferably, the detector wheels are designed as incremental encoder wheels which have a large number of alternating features in the circumferential direction, so that a relative detection of the angle of rotation of the respective detector wheels can be easily realized. An absolute value of the relative rotational twist can then be formed, for example, by a difference in the rotational angles of the detector wheels.

The relative rotation of the detector wheels corresponds to a twist tension of the torsion bar spring in the direction of rotation. The relative rotation can therefore be converted into a torque which is applied to the input shaft. If there is no relative rotation, this corresponds to a torque value of 0. The maximum detectable torque corresponds to the maximum deflection of the transverse pin within the idle travel, especially within a slotted hole, for example in the input shaft, on which gears are fixed.

The detector wheels can be equipped with the same number of increments/poles if they are designed as incremental encoder wheels. In a preferred variant, the number of increments/poles (the features alternating in the circumferential direction) is different. Here, in the case of a relative rotation, an absolute relative position can be inferred, if necessary, due to the phase shift, so that if necessary not only the relative rotation, but also the absolute rotational position of the input shaft and consequently of the cranks can be recorded.

In some cases, sensors for detecting the alternating characteristics can be designed in such a way that not only a relative rotation can be detected, but also the direction of rotation.

Preferably, the following parameters or state variables of the torque detection arrangement or transmission unit can be detected with two detector wheels: torque transmitted from the input shaft to the rotary member, speed of the input shaft and/or of the rotary member, direction of rotation of the input shaft and/or of the rotary member, and absolute rotational position of the input shaft and/or of the rotary member.

Preferably, the twisting angle detection arrangement has at least one Hall sensor, in particular at least one preloaded Hall sensor.

Alternating magnetic fields can be detected or detected by a Hall sensor. Consequently, at least one of the detector wheels has alternating magnetic fields in the circumferential direction, which can be formed, for example, by a plurality of magnets arranged offset in the circumferential direction.

When using a biased Hall sensor, the Hall sensor itself generates a magnetic field which is changed by circumferentially variable shapes, such as teeth of a driving wheel, the change being detectable by such a biased Hall sensor.

With this design, the detector wheels do not have to be designed as separate wheels, but can, for example, be formed by the drive wheel itself or a peripheral section of the input shaft or a component that is connected to it anyway.

The at least one Hall sensor is preferably fixed to the housing, i.e. fixed in relation to a housing of the torque detection arrangement or a transmission unit in which such a torque detection arrangement is installed. It is therefore not necessary to connect the detector wheels with electronics. Preferably, the torque detection arrangement has no rotating electronics.

In the transmission unit, it is preferred if an electric drive can be connected to a shaft of the transmission unit, the electric drive being assigned a control unit which is designed to control the electric drive on the basis of the detected twisting in order to couple a corresponding torque into the transmission unit.

This allows an additional drive torque to be provided precisely and individually for driving the vehicle, making driving the vehicle particularly comfortable.

It is also preferred if the input shaft of the torque sensing assembly is designed as a through shaft and is connectable at its ends with cranks for driving the input shaft. A torque provided by the cranks can be detected directly, eliminating the need for conversion of a gear ratio.

Furthermore, it is preferred if the driven wheel is mounted on a countershaft of the transmission unit and forms a shift clutch operable wheel pair with the drive wheel. In this way, a spur gear unit can be formed with simple means.

Preferably, the transmission unit has a plurality of gear ratios formed by a plurality of such wheel pairs. The transmission unit may be designed as one transmission group with a plurality of such wheel pairs, but may also be formed by two transmission groups connected in series, in order to be able to increase the number of gear steps accordingly, as is also described in document DE 10 2011 1210 675 A1, for example.

It goes without saying that the features mentioned above and those yet to be explained below can be used not only in the combination indicated in each case, but also in other combinations or on their own, without leaving the scope of the present invention.

BRIEF DESCRIPTION OF THE SEVERAL VIEWS OF THE DRAWING

Examples of the invention are shown in the drawing and are explained in more detail in the following description, wherein:

FIG. 3 is a longitudinal sectional view through a torque detection arrangement and a section of a gearbox;

FIG. 3a is a modification of the torque detection arrangement of FIG. 3;

EMBODIMENTS

Figure 1:
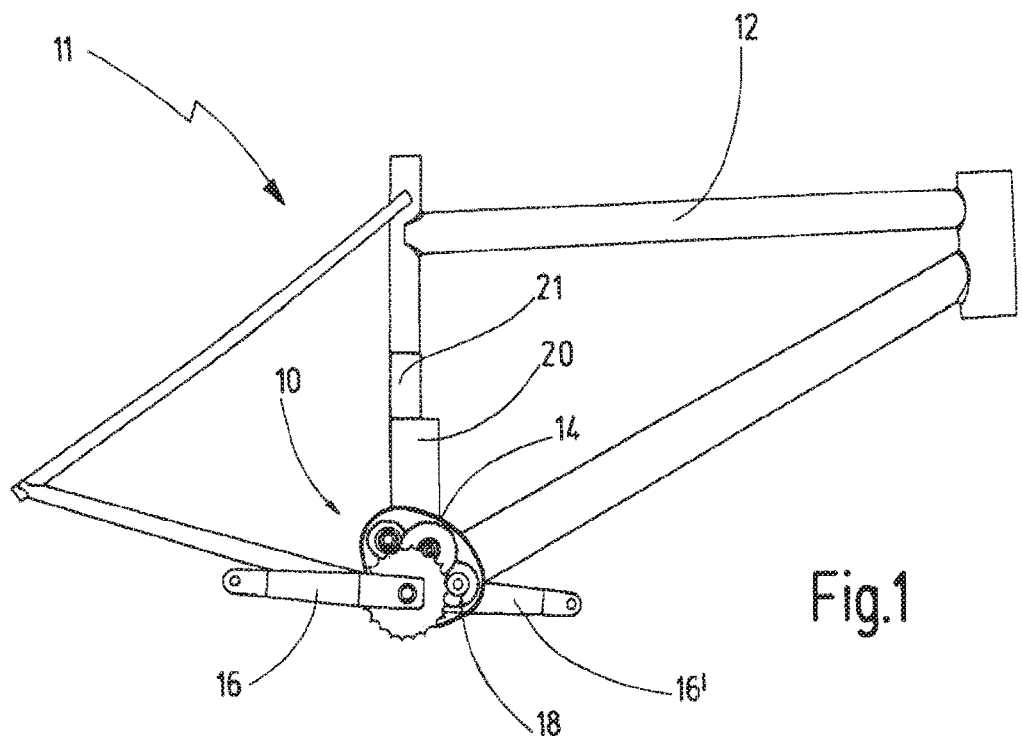
FIG. 1 is a side view of a bicycle frame with a multi-speed transmission and an electric drive.

FIG. 1 shows a transmission unit for a muscle-powered vehicle 11 and is generally designated 10. The vehicle 11 can be a bicycle in particular.

FIG. 1 shows a side view of a bicycle frame 12, which has a gear housing 14, inside which the gear unit 10 is accommodated. The gear unit 10 is schematically indicated in this illustration and is designed as a compact unit. The transmission unit 10 is described here for use with a two-wheeler, for example, although it can also be used with other vehicles driven by muscle power.

The transmission unit 10 is designed as a countershaft transmission and is designed to establish a plurality of gear steps, in particular to establish at least six forward gear steps, in particular at least nine forward gear steps, and preferably less than 27 forward gear steps.

The transmission unit 10 and the transmission housing 14, together with the pedal cranks 16, 16', form a multi-speed transmission 18. The bicycle 12 also has an electric drive 20 connected to the multi-speed transmission 18 to drive the vehicle in addition to the drive via the pedal cranks 16, 16'. The electric drive 20 is connected to an electric power source 21 which supplies electric power to the electric drive 20. The energy source 21 is preferably an accumulator 21.

For example, one axis of rotation of the electric drive 20 may be aligned at right angles to an axis of a crankshaft of bicycle 11. The driving force of the electric drive 20 can then be coupled into the multi-speed transmission 18 via an angular drive, for example.

Figure 2:
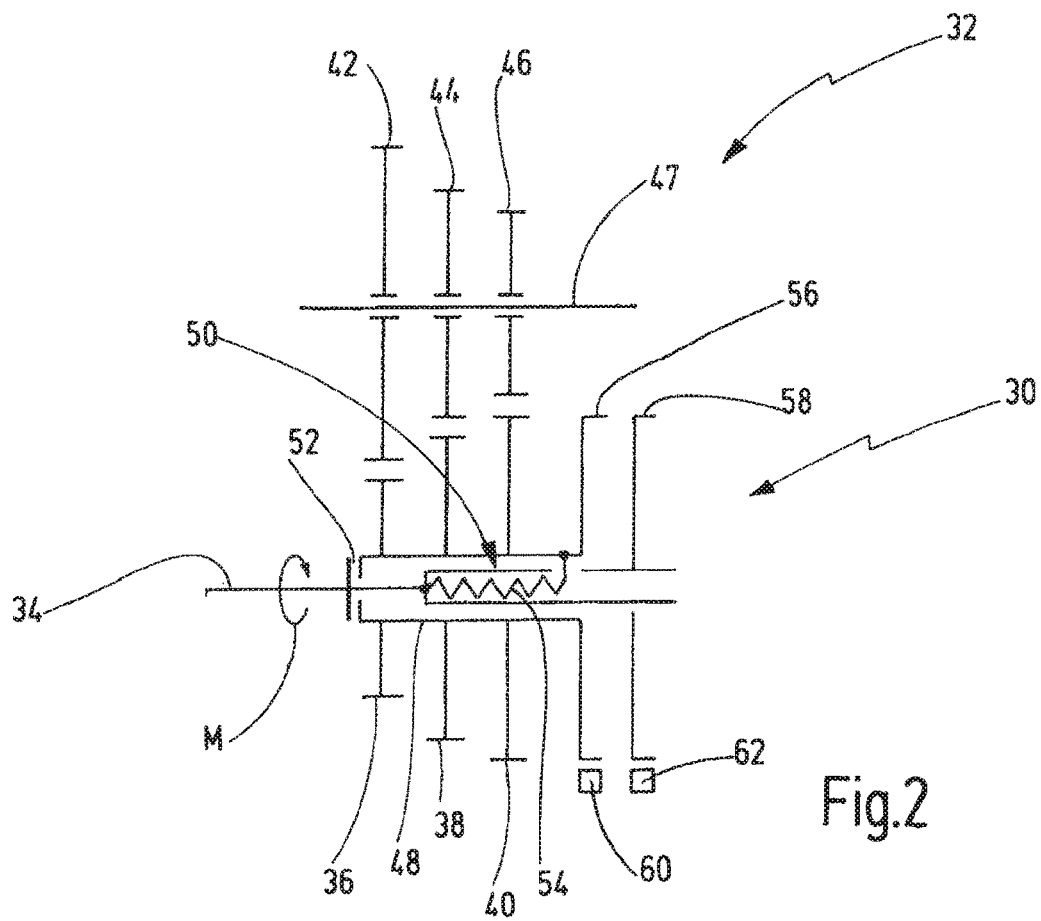
FIG. 2 is a schematic representation of a circuit diagram of a torque detection arrangement in a multi-speed transmission.

In FIG. 2, a torque detection arrangement is shown schematically and generally designated 30. In the illustration in FIG. 2, the torque detection arrangement 30 is formed as part of a gearbox 32, which can, for example, be part of a multi-speed transmission, as shown in FIG. 1 at 18.

The torque detection arrangement 30 has an input shaft 34 via which a torque M to be detected can be transmitted. The input shaft 34 is aligned along a longitudinal axis 34 which may be coaxial with a crankshaft axis of the bicycle 11.

Drive wheels 36, 38, 40 are mounted on the input shaft 34 and are non-rotatably connected to each other. The drive wheels 36, 38, 40 mesh with driven wheels 42, 44, 46 and form pairs of wheels with them. The driven wheels 42, 44, 46 are rotatably mounted on a countershaft 48. The driving wheels 36, 38, 40 and the driven wheels 42, 44, 46 together form the gearbox 32.

In an alternative design, the torque detection assembly 30 may also be associated with only one driving wheel 36 which is connected or connectable to a driven wheel 42 to transmit a torque M from the input shaft 34.

The drive wheels 36, 38, 40 are connected to each other in a rotationally fixed manner via a common sleeve 48. In addition, the drive wheels 36, 38, 40 are connected to the input shaft 34 via a torsion spring arrangement 50 which is elastically resilient in the direction of rotation. The drive wheels 36, 38, 40 are also mounted on the input shaft 34 by means of a rotation angle limiter 52. The rotation angle limiter 52 can, for example, act between the sleeve 48 and the input shaft 34. The rotation angle limiter 52 provides an idle travel in the direction of rotation between the input shaft 34 and the drive wheels 36, 38, 40, by which the input shaft 34 can rotate relative to the drive wheels 36, 38, 40. The rotation angle by which the input shaft 34 is rotatably mounted relative to the drive wheels is limited by the idle travel and can, for example, lie in a range of 1° to 15°, preferably in a range of 1° to 10°.

The torque detection assembly 30 further comprises a torsion spring 54 aligned along an axis of the input shaft 34 and disposed within the input shaft 34, particularly within a hollow shaft portion of the input shaft 34.

The input shaft 34 can be designed as a continuous hollow shaft, but can also include a solid shaft section and a hollow shaft section, as shown in FIG. 2.

The torque detection arrangement 30 also has a twisting angle detection arrangement. The twisting angle detection arrangement includes a first detector wheel 56 which is non-rotatably connected to the drive wheels 36, 38, 40. The twisting angle detection arrangement further comprises a second detector wheel 58 which is non-rotatably connected to the input shaft 34. The detector wheels 56, 58 have an identical diameter in one version and are arranged axially next to each other. A first angle of rotation sensor 60 is assigned to the first detector wheel 56. A second angle of rotation sensor 62 is assigned to the second detector wheel 58.

Due to the angle of rotation limiter 52, the input shaft 34 is mounted so that it can rotate relative to the drive wheels 36, 38, 40 by the predefined angle of rotation, whereby the predefined angle of rotation is formed by the idle travel of the angle of rotation limiter 52. When the torque M to be measured is transmitted via the input shaft 34, the input shaft 34 can be rotated by the idle travel relative to the drive wheels, 36, 38, 40, whereby the torsion spring 54 of the torsion spring arrangement 50 is tensioned or elastically twisted. Depending on the amount of torque applied, the torsion angle is established in accordance with a spring constant of the torsion spring 54. The torsion angle can be detected by the torsion angle sensors 60, 62 of the twisting angle detection arrangement and is preferably proportional to the torque M introduced.

If the torque M exceeds a predetermined value, so that the twisting angle exceeds the twisting angle predefined by the idle travel, the input shaft 34 strikes against a stop of the angle of rotation limiter which limits the idle travel. The torque M introduced is then transmitted directly to the drive wheels 36, 38, 40.

The torsion spring element 50 can also be pretensioned by the angle of rotation limiter 52 or the idle travel in such a way that the torsion spring element 50 in an unloaded state, i.e. when the introduced torque M is zero or does not exceed a predetermined value, is initially not loaded. Only when the torque M exceeds the predetermined value is the torsion spring 50 loaded by the torque M until the torque M reaches a further predetermined value, so that the input shaft 34 strikes the stop. In this way a certain torque range can be defined within which the torque M is to be detected by the torque detection arrangement 30.

As the torsion angle is limited by the angle of rotation limiter 52, the spring constant of the torsion spring 50 can be selected to be very small. In this way, the sensitivity of the torque detection arrangement 30 can be increased. Furthermore, a precise and sensitive torque detection arrangement 30 can be provided by simple technical means, which shows a usual and acceptable response behaviour due to the angle of rotation limitation 52.

It goes without saying that the application of the torque detection arrangement 30, which is shown in FIG. 2 with the multi-speed gearbox 32, is only exemplary. Alternatively, the torque detection arrangement 30 can also be connected to a single drive wheel which is connected or connectable to a single driven wheel, wherein the driven wheel can also be arranged coaxially to the drive wheel.

In a further version, the individual drive gear can also be part of a planetary gear or be connected or connectable to a planetary gear. The individual drive gear can be connected or is made connectable to a sun gear, a planet carrier or a ring gear of such a planetary gear.

Figure 4:
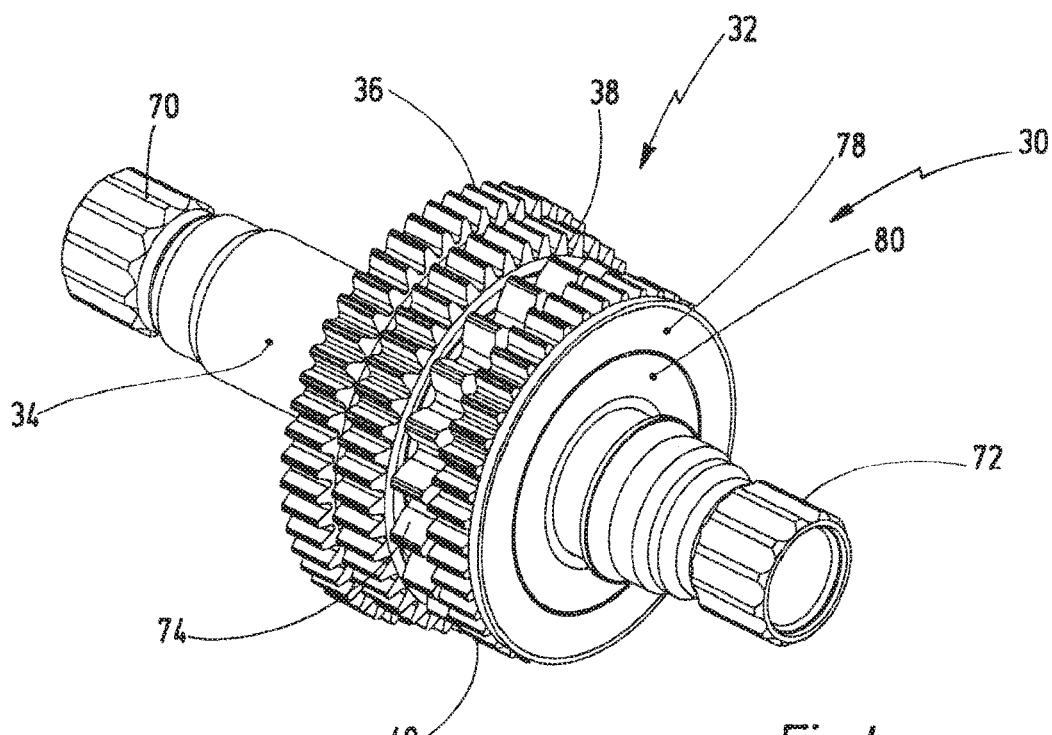
FIG. 4 is a perspective view of the torque detection arrangement of FIG. 4.
Figure 5:
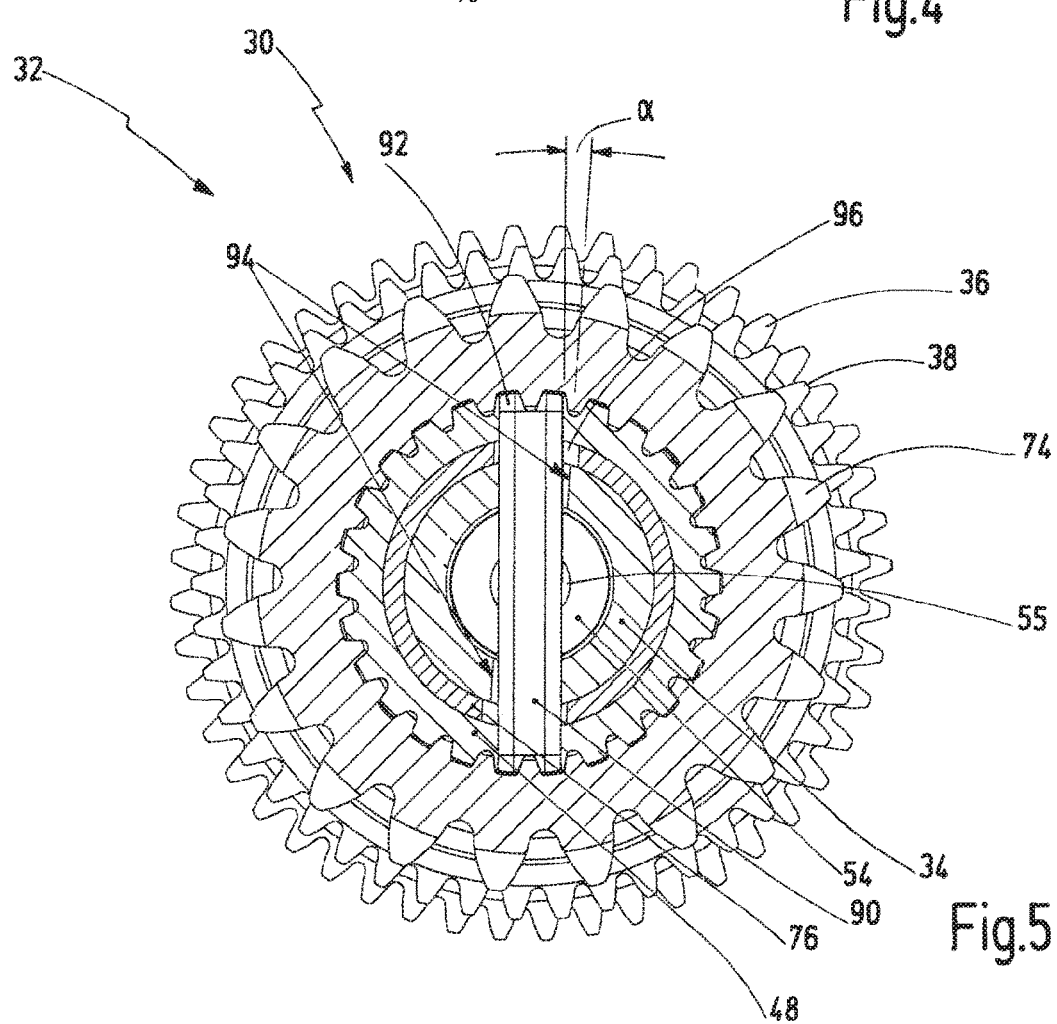
FIG. 5 is a cross-sectional view along the line V-V of FIG. 3.

A preferred design of a torque detection arrangement 30 is shown in FIGS. 3 to 5. The design of the torque detection arrangement 30 in FIGS. 3 to 5 generally corresponds to the design and function of the torque detection arrangement 30 in FIG. 2. Identical elements are therefore represented by identical reference signs. Essentially the differences are explained below.

In the torque detection arrangement 30 of FIGS. 3 to 5, the input shaft 34 has a first crank fixing section 70 at a first axial end and a second crank fixing section 72 at a second axial end, to which respective cranks 16, 16' can be fixed.

Furthermore, a further drive wheel 74 is fixed axially between the drive wheel 38 and the drive wheel 40 on the sleeve 48.

Sleeve 48 is mounted on a rotational bearing 76 with low friction and can be rotated relative to the input shaft 34. The rotational bearing 76 can be a plain bearing, for example, but can also be a roller bearing.

The first detector wheel 56' is connected to the sleeve 48 and is located radially outside the second detector wheel 58', which is fixed to the outer circumference of the input shaft 34. On the detector wheels 56', 58' respective pole discs 78, 80 can be fixed, which are axially aligned with each other in the embodiment shown in FIG. 3. The pole discs 78, 80 are preferably magnetic pole discs which form an alternating magnetic field over at least one circumferential section. The alternating magnetic field in the design of FIG. 3 is preferably aligned in the axial direction and can be detected by means of respective rotation angle sensors 60, 62, which are arranged axially adjacent to the respective pole discs 78, 80.

FIG. 3*a* shows an alternative design in which the angle of rotation sensors 60', 62' are formed by pre-loaded Hall sensors. In this case, the first detector wheel 56' can be formed by a drive wheel 40 or its toothing. In the case of the second detector wheel 58', this can be, for example, a wheel formed with a plurality of holes distributed in the circumferential direction or the like, i.e. mechanical features suitable for interfering with a magnetic field provided by the pre-loaded Hall sensor 62', so that a twisting angle can be detected by means of the pre-loaded Hall sensor 62'.

The torsion spring 54 is designed as a hollow torsion bar spring, as can be seen in particular in FIG. 3. The torsion bar spring 54 has an axial through-hole 55. The torsion bar spring 54 has a first spring end 84, which is adjacent to and/or preferably overlaps in the axial direction with the first crank fixing section 70. Furthermore, the torsion bar spring 54 has a second spring end 86, which is preferably axially aligned with the change-speed gearbox 32.

The first spring end 84 has a larger outer diameter than the second spring end 86. The first spring end 84 is provided with an external spline, not further specified in FIG. 3, which meshes with an unspecified internal spline of the input shaft 34, so that the first spring end 84 and the input shaft 34 are connected to each other in the circumferential direction via a shaft-hub connection 88.

The second spring end 86, which is spaced from the first spring end 84 by a distance L, and has a radial through-hole through which a transverse pin 90 extends. The length L is preferably greater than 15 mm, especially greater than 20 mm, and is preferably less than 120 mm.

The length of the transverse pin 90 is greater than the outside diameter of the input shaft 34. Radially protruding ends 92 of the transverse pin 90 can be in contact with radially opposite inner peripheral portions of the drive wheel 74, especially for the purpose of loss prevention. The transverse pin 90 is inserted in a radial opening of the sleeve 48 with a positive fit in the circumferential direction.

The transverse pin 90 extends in the radial direction through radial openings 94 in the input shaft 34, which are each formed as a hole slotted in the circumferential direction, as shown in FIG. 5. In the circumferential direction, the radial openings 94 have such a length or angle that the transverse pin 90 and consequently the drive wheels 36, 38, 40, 74 can be rotated through an angle in relation to the input shaft 34 which lies in the following angular range: 1° to 15°, preferably 2° to 8°.

The rotational bearing 76 has a radial opening 96, which is penetrated by the transverse pin 90 and which extends over a larger angle than the angle α.

The torsion bar spring 54 is manufactured in one piece from steel. An outer diameter of the second spring end 86 is larger than an outer diameter of the intermediate piece between the spring ends 84, 86 and smaller than an inner diameter of a through hole of the input shaft 34. Therefore, the torsion bar spring 54 can be easily mounted on the input shaft 34 by inserting the torsion bar spring 54 with the second spring end 86 as a leading end into the through hole of the input shaft 34.

Finally, an external toothing of the first spring end 84 engages with an internal toothing of the input shaft 34, and the torsion bar spring 54 can be further inserted axially until the second spring end 86 is aligned with the radial openings 94, so that the transverse pin 90 can then be inserted. Then the change-speed gearbox 32 can be completely assembled. The drive gear 74 forms a loss prevention or radial fixing for the transverse pin 90.

What is claimed is:

1. A transmission unit for a muscle power driven vehicle, said transmission unit comprising a torque detection arrangement, the torque detection arrangement comprising:
    an input shaft via which a torque for driving the vehicle can be transmitted, which torque is to be detected,
    at least one rotary member which is mounted on the input shaft and which is designed to transmit the torque,
    a torsion spring arrangement, wherein the input shaft and the rotary member are resiliently connected in the direction of rotation via the torsion spring arrangement, and
    a twisting angle detection arrangement adapted to detect twisting of the rotary member relative to the input shaft, wherein the input shaft is formed as a hollow shaft,
wherein a torsion spring of the torsion spring arrangement is arranged within the hollow input shaft,
wherein the torsion spring is non-rotatably connected at a first spring end to an inside of the input shaft and is non-rotatably connected at a second spring end to the rotary member, and
wherein the second spring end is non-rotatably connected to a transverse pin which extends through a radial opening in the input shaft and which is non-rotatably connected to the rotary member.

2. The transmission unit according to claim 1, wherein the torsion spring arrangement comprises a torsion bar spring.

3. The transmission unit according to claim 1, wherein the torsion spring has a spring axis which is aligned parallel to the input shaft.

4. The transmission unit according to claim 1, wherein the radial opening is formed as a slot in the circumferential direction, so that the transverse pin can be rotated to a limited extent relative to the input shaft over an idle travel.

5. The transmission unit according to claim 1, wherein the transverse pin radially outwardly abuts an inner peripheral portion of the rotary member or a sleeve to which the rotary member is non-rotatably connected.

6. The transmission unit according to claim 1, wherein the rotary member is non-rotatably connected to a sleeve, which is mounted on the input shaft via a rotary bearing so as to be rotatable at least to a limited extent with respect to the input shaft and/or to which at least one second rotary member is non-rotatably connected.

7. The transmission unit according to claim 1, wherein the torsion spring is a bar spring made of a material which permits elastic rotation of a first spring end relative to a second spring end.

8. The transmission unit according to claim 1, wherein the twisting angle detection arrangement has a Hall sensor.

9. The transmission unit according to claim 8, wherein Hall sensor is a preloaded Hall sensor.

10. A transmission unit for a muscle power driven vehicle, said transmission unit comprising a torque detection arrangement, the torque detection arrangement comprising:
   an input shaft via which a torque for driving the vehicle can be transmitted, which torque is to be detected,
   at least one rotary member which is mounted on the input shaft and which is designed to transmit the torque,
   a torsion spring arrangement, wherein the input shaft and the rotary member are resiliently connected in the direction of rotation via the torsion spring arrangement, and
   a twisting angle detection arrangement adapted to detect twisting of the rotary member relative to the input shaft,
wherein the torsion spring arrangement comprises a torsion bar spring,
wherein the torsion spring is non-rotatably connected at a first spring end to an inside of the input shaft and is non-rotatably connected at a second spring end to the rotary member, and
wherein the second spring end is non-rotatably connected to a transverse pin which extends through a radial opening in the input shaft and which is non-rotatably connected to the rotary member.

11. A torque detection arrangement for a muscle power driven vehicle, comprising:
   an input shaft via which a torque for driving the vehicle can be transmitted, which torque is to be detected,
   at least one rotary member which is mounted on the input shaft and which is designed to transmit the torque,
   a torsion spring arrangement, wherein the input shaft and the rotary member are resiliently connected in the direction of rotation via the torsion spring arrangement, and
   a twisting angle detection arrangement adapted to detect twisting of the rotary member relative to the input shaft,
wherein the input shaft is formed as a hollow shaft, wherein a torsion spring of the torsion spring arrangement is arranged within the input shaft,
wherein the torsion spring is non-rotatably connected at a first spring end to an inside of the input shaft and is non-rotatably connected at a second spring end to the rotary member, and
wherein the second spring end is non-rotatable connected to a transverse pin which extends through a radial opening in the input shaft and which is non-rotatable connected to the rotary member.

12. Torque detection arrangement according to claim 11, wherein the torsion spring arrangement comprises a torsion bar spring.

13. Torque detection arrangement according to claim 11, wherein the input shaft is formed as a continuous hollow shaft.

14. Torque detection arrangement according to claim 11, wherein the transverse pin engages in a radial groove of the second spring end and in a radial groove of the rotary member.

* * * * *